US012741472B2

(12) United States Patent
Connors et al.

(10) Patent No.: US 12,741,472 B2
(45) Date of Patent: Sep. 22, 2026

(54) LINER-LESS LABEL PRE-FEED SYSTEM AND METHOD

(71) Applicant: Toshiba TEC Kabushiki Kaisha, Tokyo (JP)

(72) Inventors: William M. Connors, Lexington, KY (US); Michael W. Lawrence, Lexington, KY (US); Donn D. Bryant, Lexington, KY (US)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/040,401

(22) Filed: Jan. 29, 2025

(65) Prior Publication Data

US 2025/0269664 A1 Aug. 28, 2025

Related U.S. Application Data

(62) Division of application No. 17/944,611, filed on Sep. 14, 2022, now Pat. No. 12,227,017.

(51) Int. Cl.
*B41J 3/407* (2006.01)
*B41J 15/04* (2006.01)

(52) U.S. Cl.
CPC ............. *B41J 3/4075* (2013.01); *B41J 3/407* (2013.01); *B41J 15/04* (2013.01)

(58) Field of Classification Search
CPC ..... B41J 3/4075; B41J 3/407; B65H 35/0026; B65H 2701/192; B65H 16/02; B65H 20/02
See application file for complete search history.

(56) References Cited

U.S. PATENT DOCUMENTS 5,725,320 A * 3/1998 Austin .................. B26D 1/405
400/621

* cited by examiner

*Primary Examiner* — Geoffrey S Mruk
(74) *Attorney, Agent, or Firm* — Kim & Stewart LLP

(57) ABSTRACT

A pre-feed system and method for a liner-less label printer includes a drive roller that is configured to peel liner-less labels from a reel and pass print stock comprising the labels to an in-line label printer at a consistent rate. An idler roller disposed in proximity to the drive roller creates a nip for pulling labels from the reel. Label stock is fed to one or more print heads while supported by a support plate comprising projections extending from a planar surface, contacting an adhesive side of the labels. The projections are aligned in rows substantially perpendicular to a travel direction of the moving print stock and in a plurality of columns substantially parallel to the travel direction of the moving print stock, with projections on alternate rows offset from projections on adjacent rows and projections on alternate columns offset from projections on adjacent columns.

6 Claims, 7 Drawing Sheets

LINER-LESS LABEL PRE-FEED SYSTEM AND METHOD

CROSS-REFERENCE TO RELATED APPLICATION

This application is a divisional of U.S. patent application Ser. No. 17/944,611, filed Sep. 14, 2022, now U.S. Pat. No. 12,227,017, issued Feb. 18, 2025, the disclosure of which is herein incorporated by reference in its entirety.

BACKGROUND OF THE INVENTION

This application relates generally to a label printing system and more particularly to a printer feed mechanism for printing liner-less labels.

Label printers typically print indicia, such as mailing addresses, onto a label that has adhesive on one side. The adhesive is generally covered with a release paper, or liner, that is removed prior to the label being placed onto the desired object, such as a letter or a box for shipping. These labels requires a person, or mechanism, to remove the release paper which is then discarded, resulting in waste that must be disposed of appropriately. Alternatively, a clear plastic sleeve can be configured to accept a printed paper insert, however these sleeves also include a release paper that covers the adhesive portion that must be removed and discarded.

BRIEF DESCRIPTION OF THE DRAWINGS

Various embodiments will become better understood with regard to the following description, appended claims and accompanying drawings wherein:

DETAILED DESCRIPTION OF THE INVENTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Existing label feed systems for printers generally accommodate labels that include release paper or liners that cover adhesive on one side of the labels. After printing such a label, the release paper or liner is removed and discarded. By printing onto a liner-less label, waste associated with release paper or liners can be eliminated, making liner-less label printers more environmentally friendly. Liner-less label printers also reduce extraneous costs associated with disposing of discarded release paper and liners, including labor costs and disposal costs.

A liner-less label can include a single sheet with a designated area on the front side for a customer's shipping address. A liner-less label can also include an adhesive area around the periphery of the back side of the label with a designated print area in the center for printing shipping and customer invoice information. In embodiments, the labels are received as a continuous form on a reel containing a plurality of labels. In instances where printing is to made on label stock with an exposed adhesive side, supporting the stock as it moves through the printer is problematic. Label stock will adhere to smooth, flat surfaces as may be used to guide paper stock or lined label stock. Guide rollers can accumulate adhesive and can add unwanted tension to the label stock. Guide rollers further add to printer cost and complexity. Coarse or gritty surfaces will have a lessened tendency to stick, however some adhesive may be removed as stock passes over, resulting in an accumulation of adhesive over time.

Figure 1A:
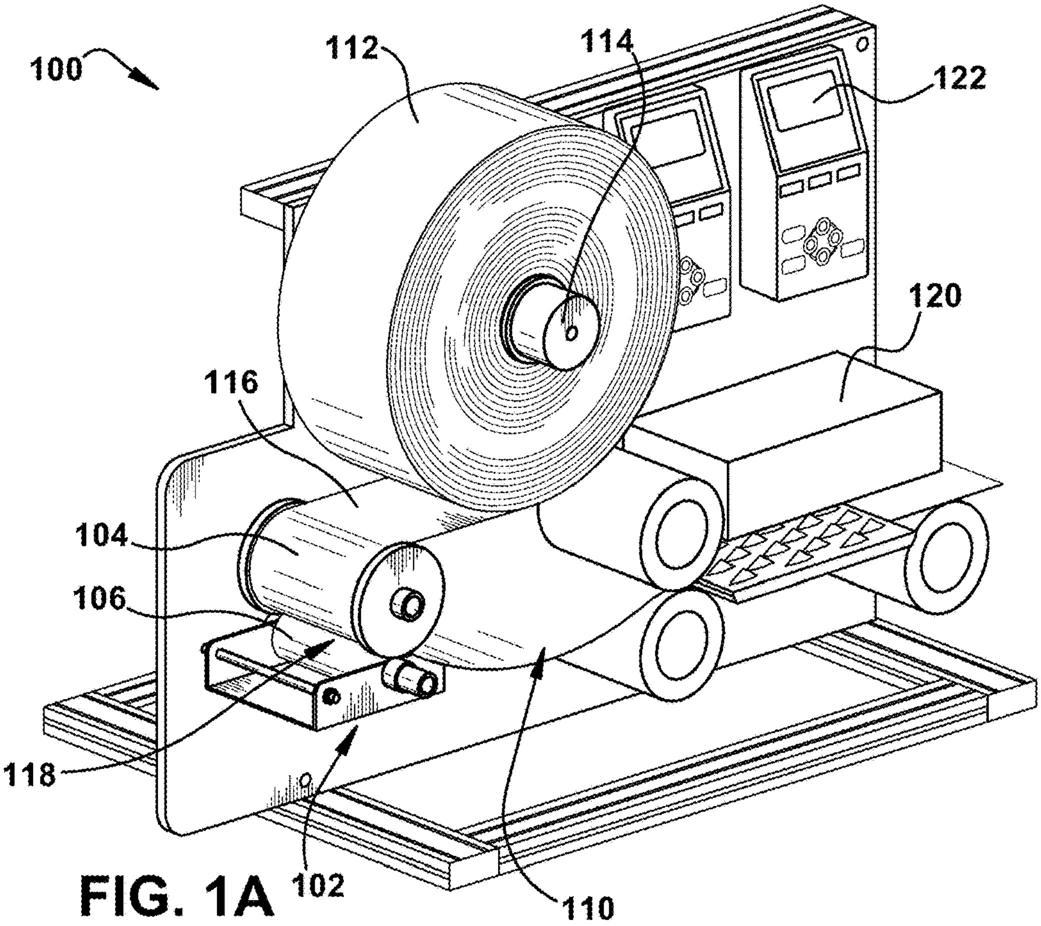
FIG. 1A is a first view of an example embodiment of a label printer for liner-less labels.
Figure 1B:
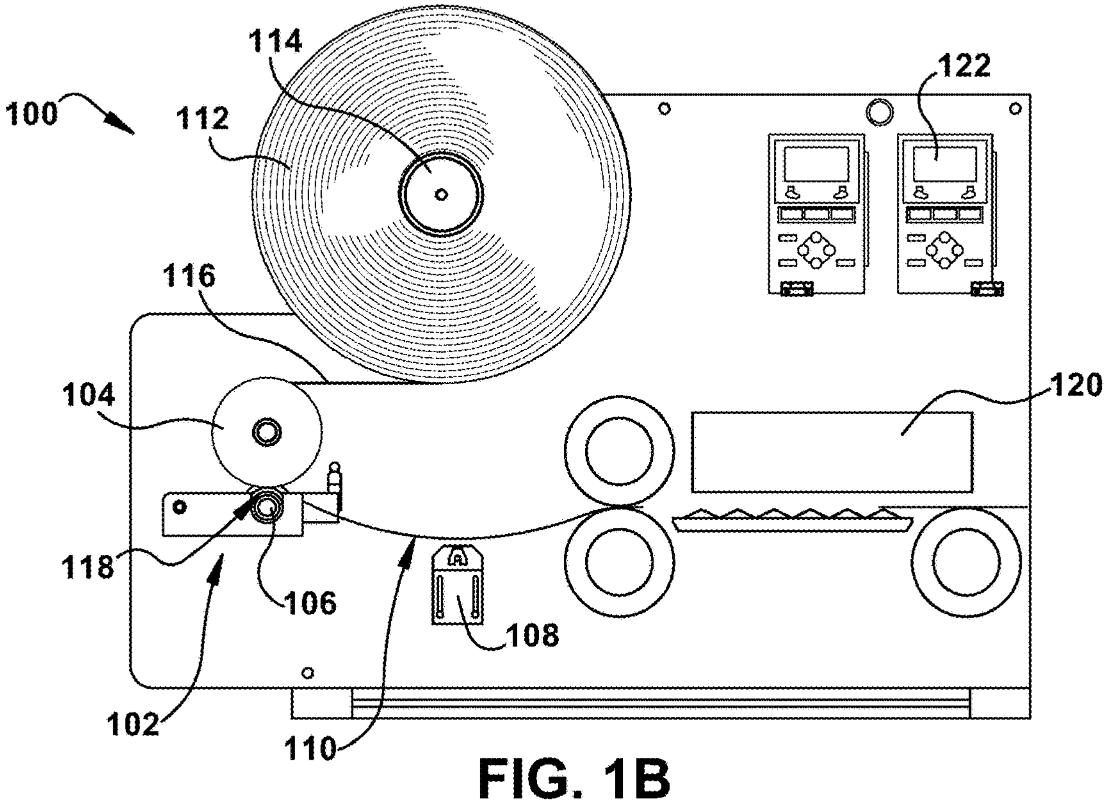
FIG. 1B is a second view of an example embodiment of a label printer for liner-less labels.

In accordance with the subject application, FIGS. 1A and 1B illustrate an example embodiment of a liner-less print system 100. The liner-less print system 100 includes a pre-feed mechanism 102 comprising a rubber, powered drive roller 104, a silicone rubber idler roller 106, and a non-contact reflective object sensor 108. A reel 112 of liner-less labels 116 is mounted on a rotatable spindle 114. Liner-less labels 116 from the reel 112 are threaded through the nip 118 between the drive roller 104 and the idler roller 106. The drive roller 104 is comprised of rubber or another similar material configured to contact the printable top surface of the liner-less labels 116. Idler roller 106 advantageously is comprised of silicone or another similar material configured to contact the bottom surface of the liner-less label 116 without adhering to or sticking to the adhesive material on the bottom surface of the liner-less label 116.

The drive roller 104 and idler roller 106 pass the liner-less labels 116 to the in-line printer 120. A non-contact reflective object sensor 108 monitors the amount of slack 110 in the liner-less labels 116 in the path between the pre-feed mechanism 102 and the in-line printer 120. The liner-less labels 116 are pulled into the in-line printer 120 at a consistent rate, indicia are printed on one or both sides of the liner-less labels 116, and the label is cut to size by an associated finisher in the in-line printer 120.

In operation, the drive roller 104 is rotated by a print controller 122 to pull liner-less labels 116 from the reel 112 into the nip 118 at approximately the same rate that the liner-less labels 116 are consumed by the in-line printer 120. The print controller 122 monitors the sensor 108 and maintains the proper amount of slack 110 in the liner-less labels 116 that are passed to the in-line printer 120. The pre-feed mechanism 102 advantageously pulls the liner-less labels 116 from the reel 112 and presents them to the input queue of the in-line printer 120 such that a low and consistent force is required by the in-line printer 120 to pull the liner-less labels 116 into the in-line printer 120 for printing and sizing. This low and consistent force advantageously not only reduces misfeeds and paper jams, but also improves the quality of printing on the liner-less labels 116 which are fed at a more consistent rate across the printer mechanism.

The liner-less labels 116 can include a printable top surface configured to accept address indicia associated with a shipping label and a bottom surface that includes adhesive. In embodiments, the adhesive is disposed over only a certain portion of the bottom surface, for example around the edges, leaving a second printable area for accepting additional printed indicia such as invoice information for the end customer. In these embodiments, the consumer can remove the label from a received shipment to view the printed indicia on the bottom surface of a liner-less label 116.

Figure 2:
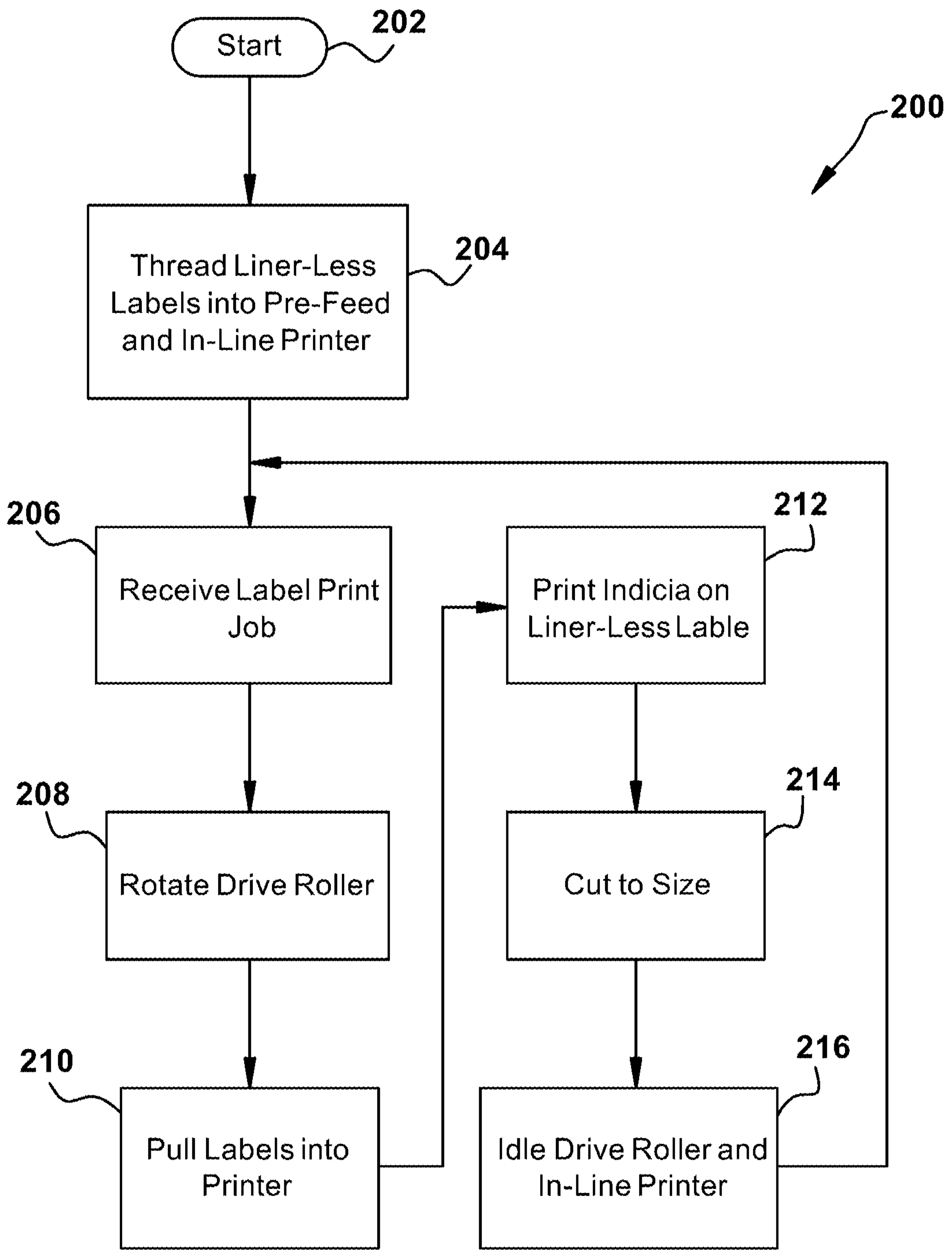
FIG. 2 is a flowchart of example operations of a liner-less label printer.

Turning now to FIG. 2, illustrated is a flowchart 200 of example operations of a liner-less label printer. Operation commences at start block 202 and proceeds to block 204 where liner-less labels from a reel of labels are threaded through the nip between a drive roller and idler roller in the pre-feed mechanism, passed over a non-contact sensor, and inserted into the feed mechanism of the in-line printer. At block 206, the liner-less label printer receives a print job for a label, such as a shipping label. At block 208 the print controller rotates the drive roller with a first, high torque to pull the liner-less labels from the reel into the nip between the drive roller and idler roller and labels are pulled into the printer at block 210. At block 212 the in-line printer prints indicia on one or both sides of the liner-less label. Note that the operations of blocks 206 through 212 can be performed essentially simultaneously or in sequence as would be appreciated by one of skill in the art. At block 214 a finisher mechanism associated with the in-line printer cuts the liner-less label to size and ejects the label from the in-line printer. At block 216, the drive roller and in-line printer are idled and operation returns to block 206 to wait for the next label to be printed.

Figure 3:
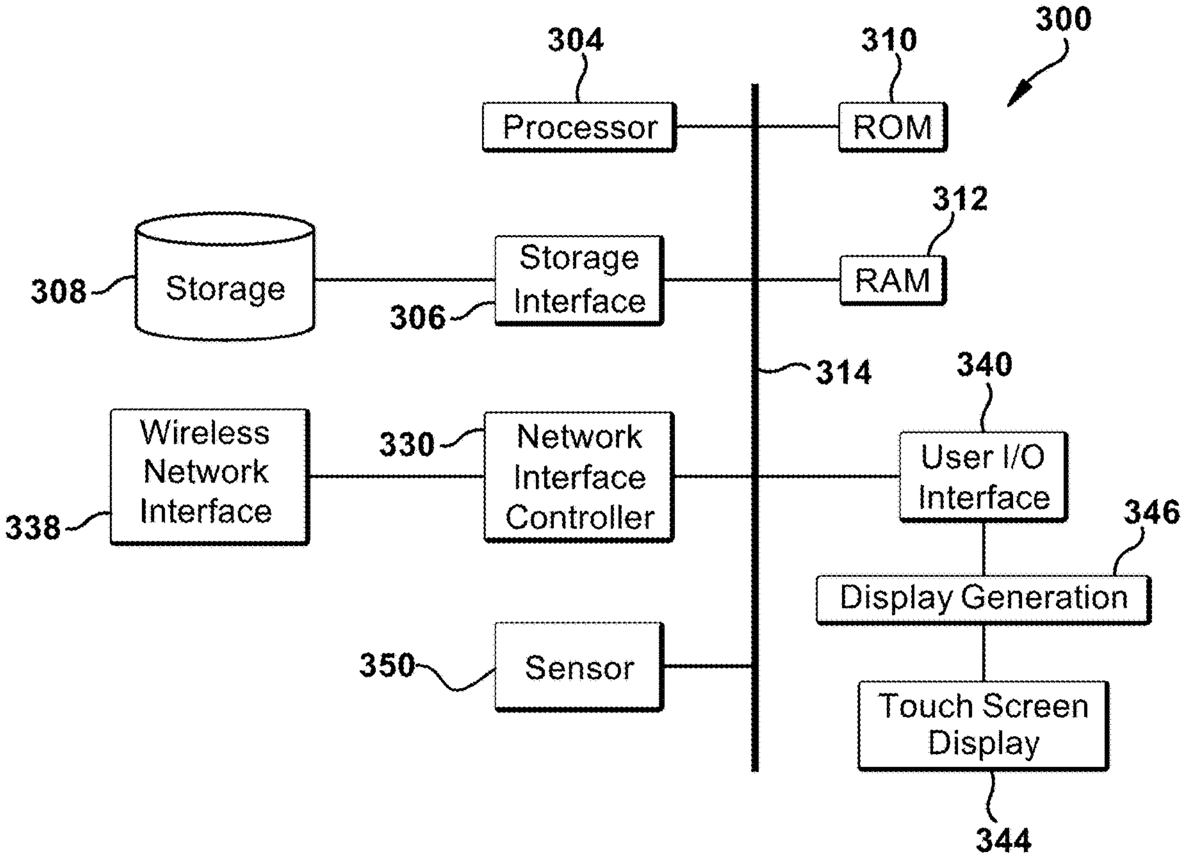
FIG. 3 is an example embodiment of a digital device such as a controller for a printer system.

Turning now to FIG. 3, illustrated is an example of a digital device system 300 suitably comprising print controller 122 of FIG. 1B. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to a print server is via a data network, such as a local area network (LAN), a wide area network (WAN), which may comprise the Internet, or any suitable combination thereof. A digital data connection is also suitably directly with a print server, such as via Bluetooth, optical data transfer, Wi-Fi direct, or the like.

Processor 304 is also in data communication with a user input/output (I/O) interface 340 which provides data communication with user peripherals, such as touch screen display 344 via display generator 346, as well as keyboards, control buttons, mice, track balls, touch screens, or the like. Processor 304 is also in data communication with sensor 350, suitably comprised of non-contact reflective object sensor for sensing slack in a continuous ribbon of unprinted labels. It will be understood that functional units are suitably comprised of intelligent units, including any suitable hardware or software platform.

Figure 4:
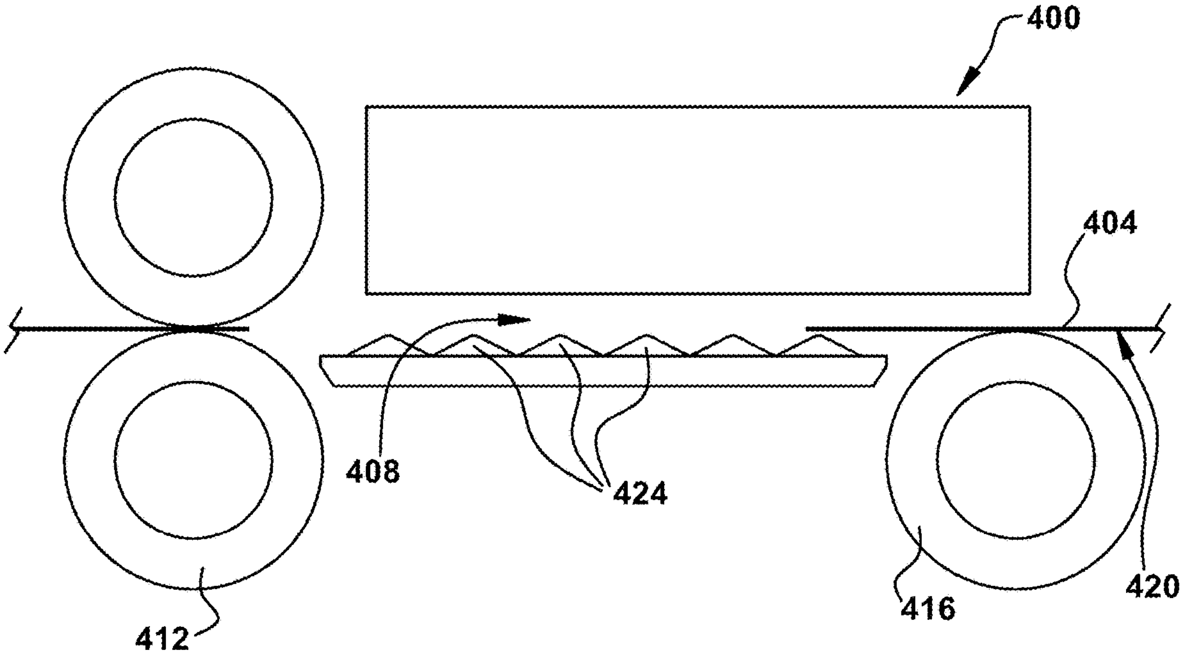
FIG. 4 illustrates an example embodiment of an in-line printer.

FIG. 4, s illustrates an example embodiment of an in-line printer, such as in-line printer 120 of FIGS. 1A and 1B. In this example, label media 404 is urged through print area 408 cooperatively by rollers 412 and 416. Label media 404 has an adhesive side 420 which is supported in print area 408 by undulating projections or ribs 424 arranged so as to provide support with minimal adhesion as detailed further below. Projections, particularly at peaks thereof as detailed below, are suitably comprised of a low friction, non-stick surface such as silicone or a fluoropolymer. Suitable surfaces may include per-and polyfluoroalkyl substances (PFAS) or a tetrafluoroethylene, a synthetic form of which is polytetrafluoroethylene (PTFE), commonly understood by the trademark TEFLON.

Figure 5:
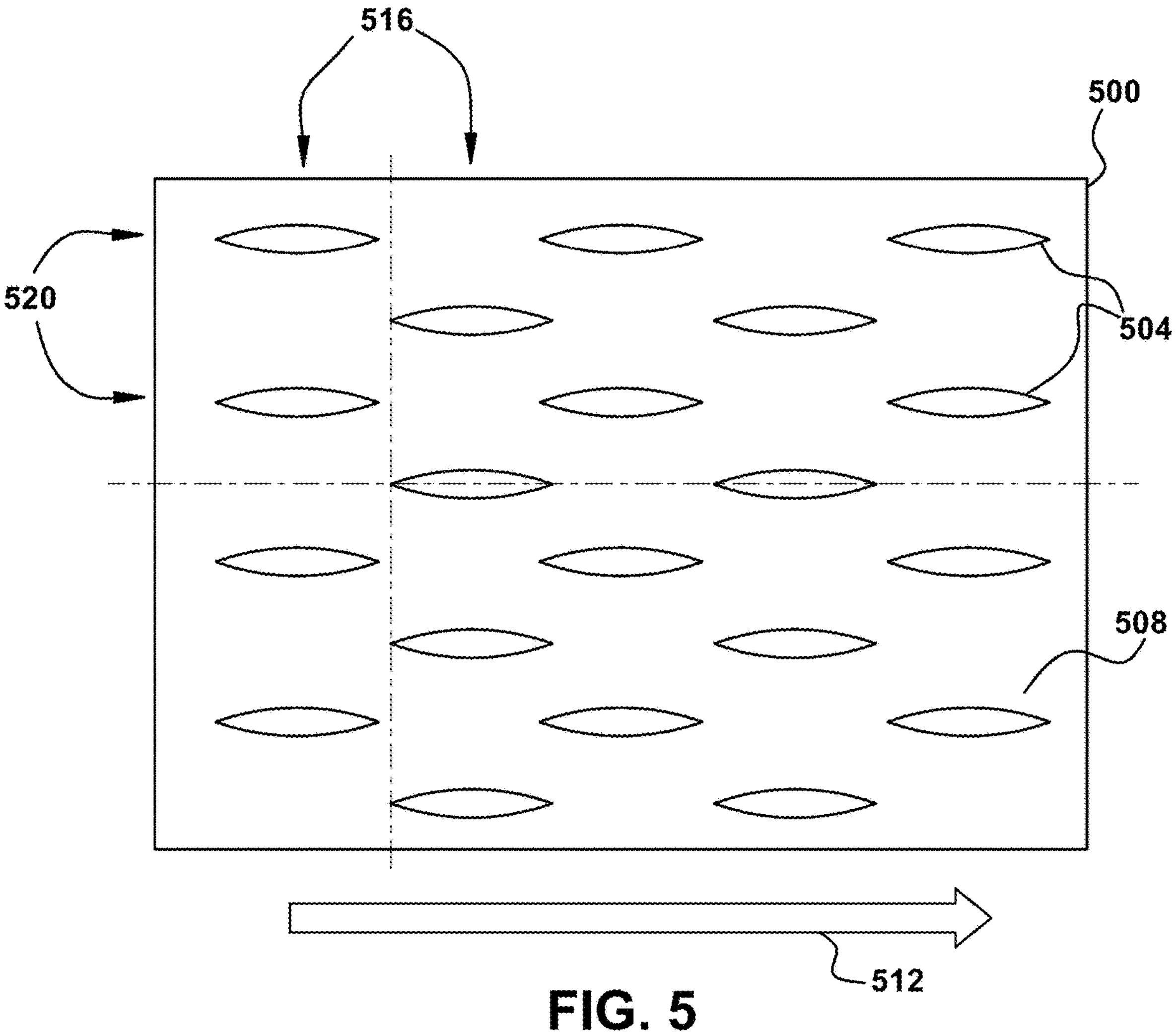
FIG. 5 illustrates an example embodiment of a fixed support plate configured to support configured to support moving print stock along its adhesive surface.

FIG. 5 illustrates an example embodiment of a fixed support plate 500 configured to support moving print stock along its adhesive surface after removal from the spool. Undulations are formed from a series of projections 504 projecting from a substantially planar top surface 508 of support plate 500 which are proximate to the adhesive surface. Projections 504 are aligned in a plurality of rows 516 substantially perpendicular to a travel direction 512 of the moving print stock and a plurality of columns 520 substantially parallel to the travel direction of the moving print stock, wherein projections on alternate rows are offset from projections on adjacent rows and wherein projections on alternate columns are offset from projections on adjacent columns. In the illustrated example, projections are positioned adjacent rows do not overlap and adjacent columns do not overlap, thus staggering contact points so as to minimize adhesion and drag while providing relatively uniform support.

Figure 6:
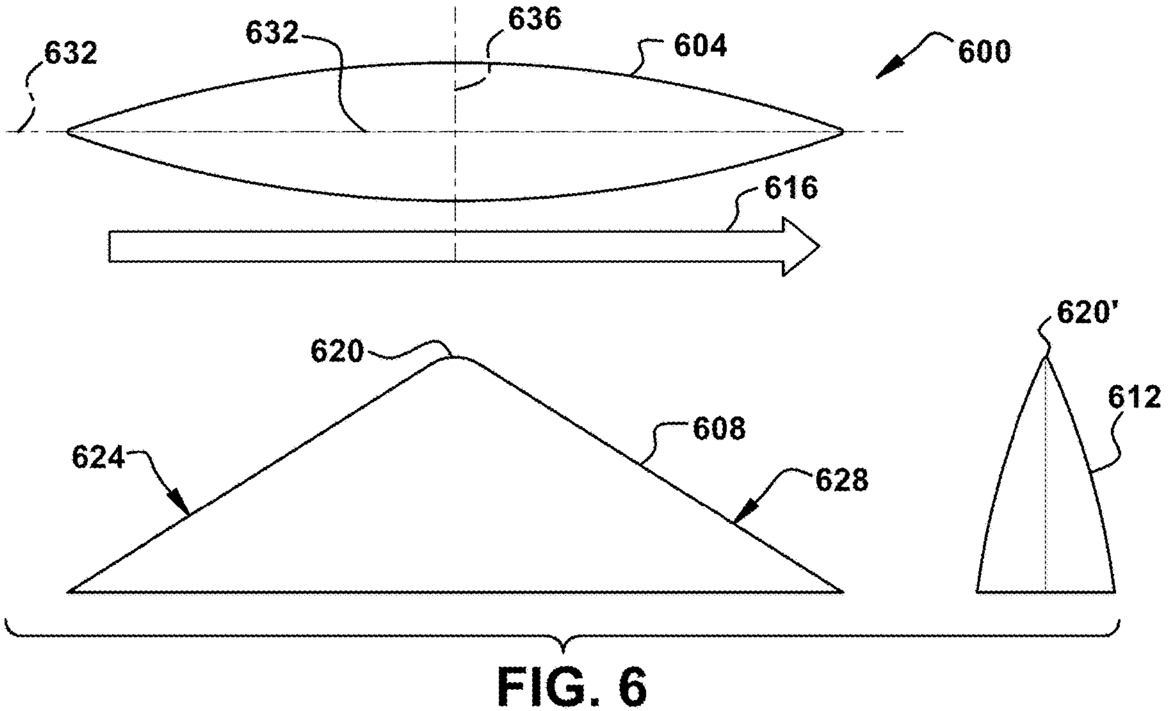
FIG. 6 illustrates an example embodiment of a print media support projection.

FIG. 6 illustrates an example embodiment of a projection 600, including top view 604, side view 608 and front view 612, defined relative to relative label stock movement direction 616. Projection 600 defines a peak area 620, 620' where contact with the adhesive side of the print media occurs with minimal contact area. Projection 600 is oval or elongated so as to define a major axis 632 and a minor axis 636. Major axis 632 is substantially parallel to label stock movement direction 616 of the moving print stock and minor axis 636 is substantially perpendicular to the travel direction of the moving print stock. Leading slope 624 is angled to receive incoming label stock while trailing slope 628 angled to release supported label stock as it moves past peak area 620.

Figure 7:
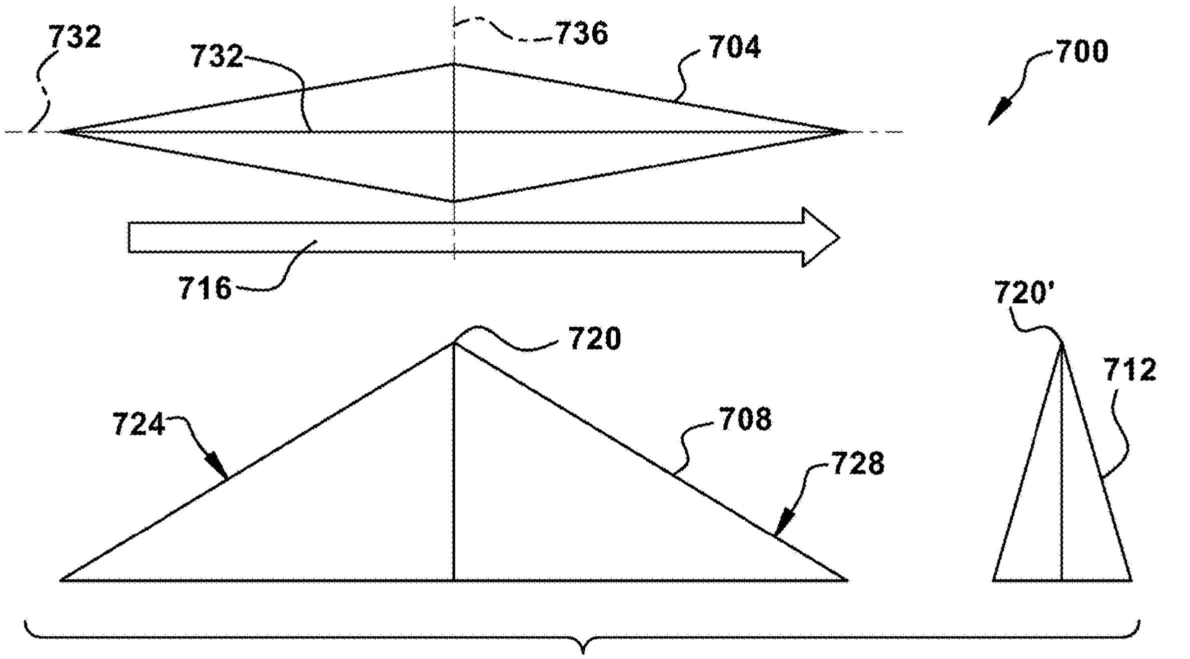
FIG. 7 illustrates another example embodiment of a print media support projection.

FIG. 7 illustrates another example embodiment of a projection 700, including top view 704, side view 708 and front view 712, defined relative to relative label stock movement direction 716. Projection 700 defines a peak area 720, 720' where contact with the adhesive side of the print media occurs with minimal contact area. Projection 700 is elongated and angled so as to define a major axis 732 and a minor axis 736. Major axis 732 is substantially parallel to label stock movement direction 716 of the moving print stock and minor axis 736 is substantially perpendicular to the travel direction of the moving print stock. Leading slope 724 is angled to receive incoming label stock while trailing slope 728 angled to release supported label stock as it moves past peak area 720.

Figure 8:
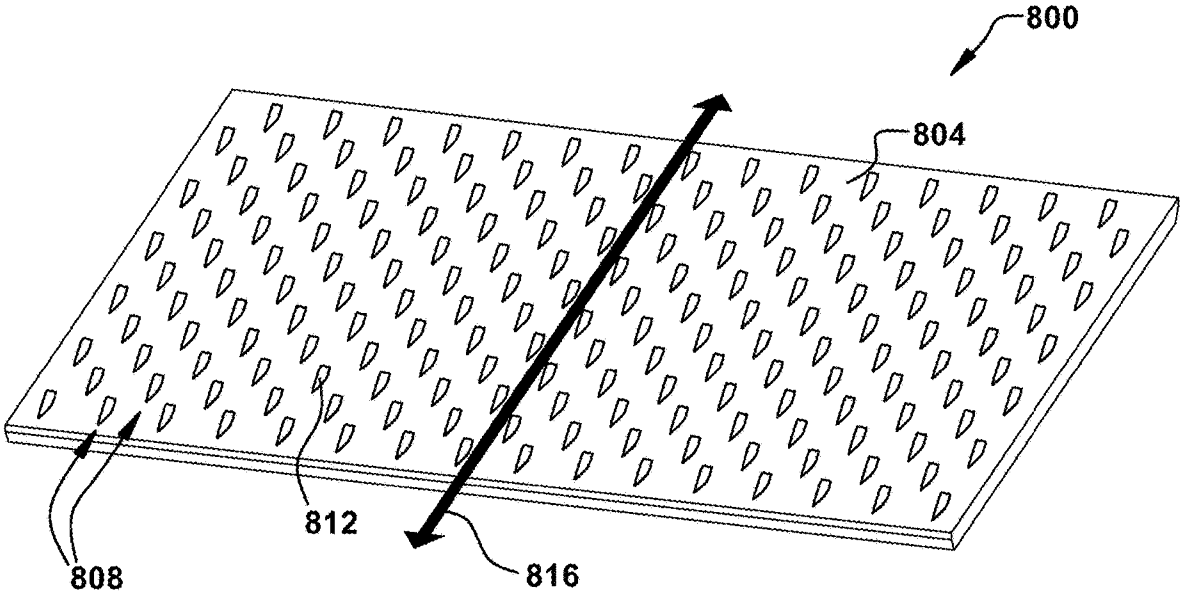
FIG. 8 is a perspective view of a support plate having projections disposed in alternate rows and columns as with FIG. 5.

FIG. 8 is a perspective view of a support plate 804 having projections 808 disposed in alternate rows and columns as with FIG. 5. Label movement is linear relative to the projections as indicated in box 812 and paper path 816.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. An in-line printer system comprising:

a spindle configured to receive a spool of printing stock;

a motor configured to remove printing stock from the spool so as to expose an adhesive surface of the printing stock;

the motor further configured to move the printing stock across a support plate, the support plate having a plurality of projections extending from a surface of the support plate to contact and support the adhesive surface of the moving print stock, the projections being aligned in a plurality of rows substantially perpendicular to a travel direction of the moving print stock and a plurality of columns substantially parallel to the travel direction of the moving print stock, wherein projections on alternate rows are offset from projections on adjacent rows and wherein projections on alternate columns are offset from projections on adjacent columns; and a print head configured to transfer indicia to the printing stock.

2. The in-line printer system of claim 1 wherein the print head is further configured to transfer the indicia to the printing stock on a second surface opposed from the adhesive surface.

3. The in-line printer system of claim 2 wherein each projection is elongated with a major axis substantially parallel to the travel direction of the moving print stock and a minor axis substantially perpendicular to the travel direction of the moving print stock.

4. The in-line printer system of claim 3 wherein each projection includes a peak portion configured to contact the adhesive surface to support the moving print stock.

5. The in-line printer system of claim 4 wherein the projections are comprised of silicone or a fluoropolymer.

6. The in-line printer system of claim 4 wherein each peak extends from an axis substantially orthogonal to an intersection of its associated major axis and minor axis.

* * * * *